INVENTORS
Henry Blake Wilson
Allen W. Mickel
BY Connolly and Hutz
ATTORNEYS

Feb. 21, 1967  H. B. WILSON ET AL  3,304,847
APPARATUS FOR COMPOSING MUSIC COPY
Filed Jan. 21, 1965  7 Sheets-Sheet 3

INVENTORS
Henry Blake Wilson
Allen W. Mickel
BY Connolly and Hutz
ATTORNEYS

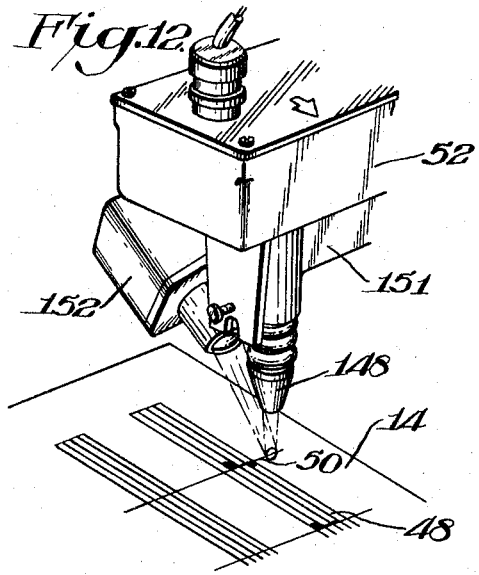
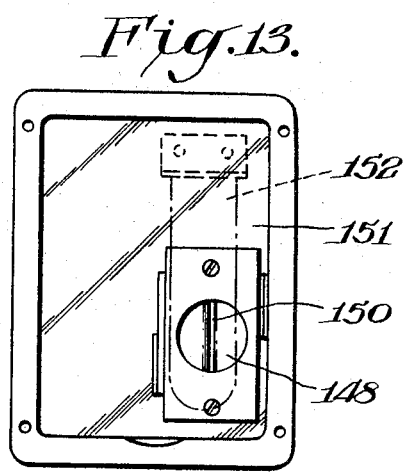
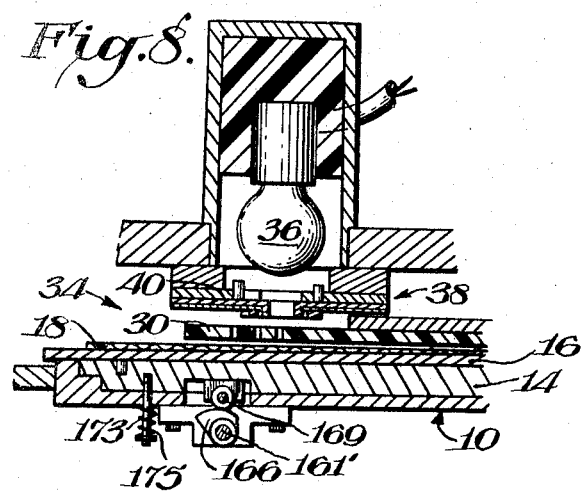
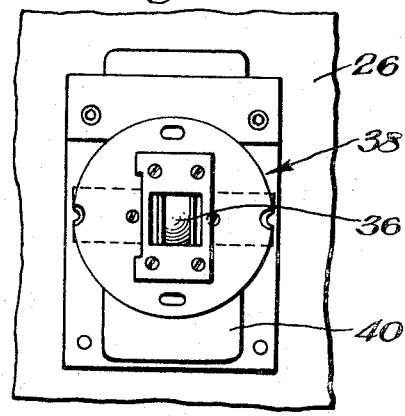
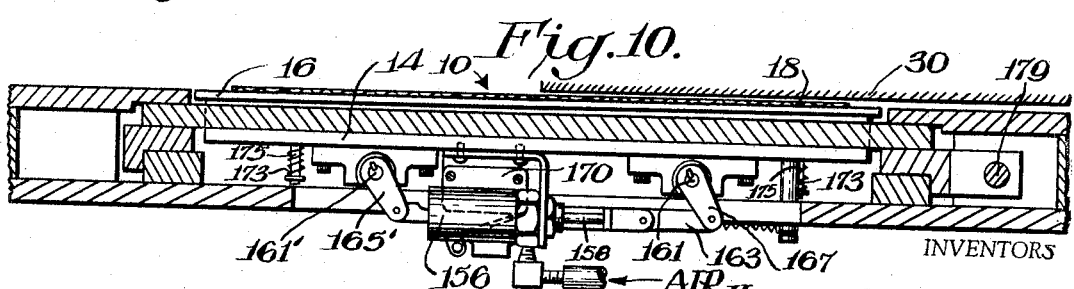

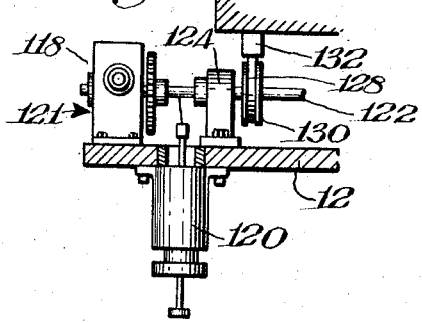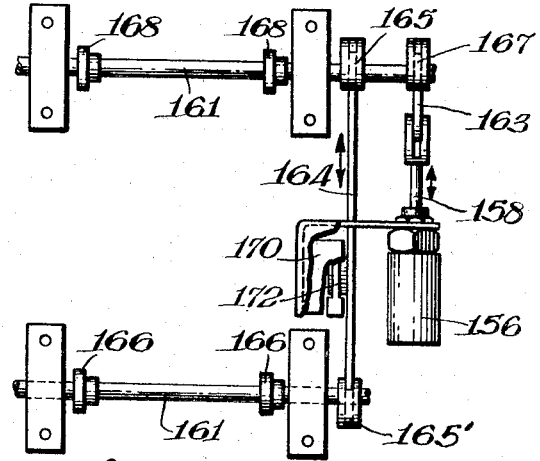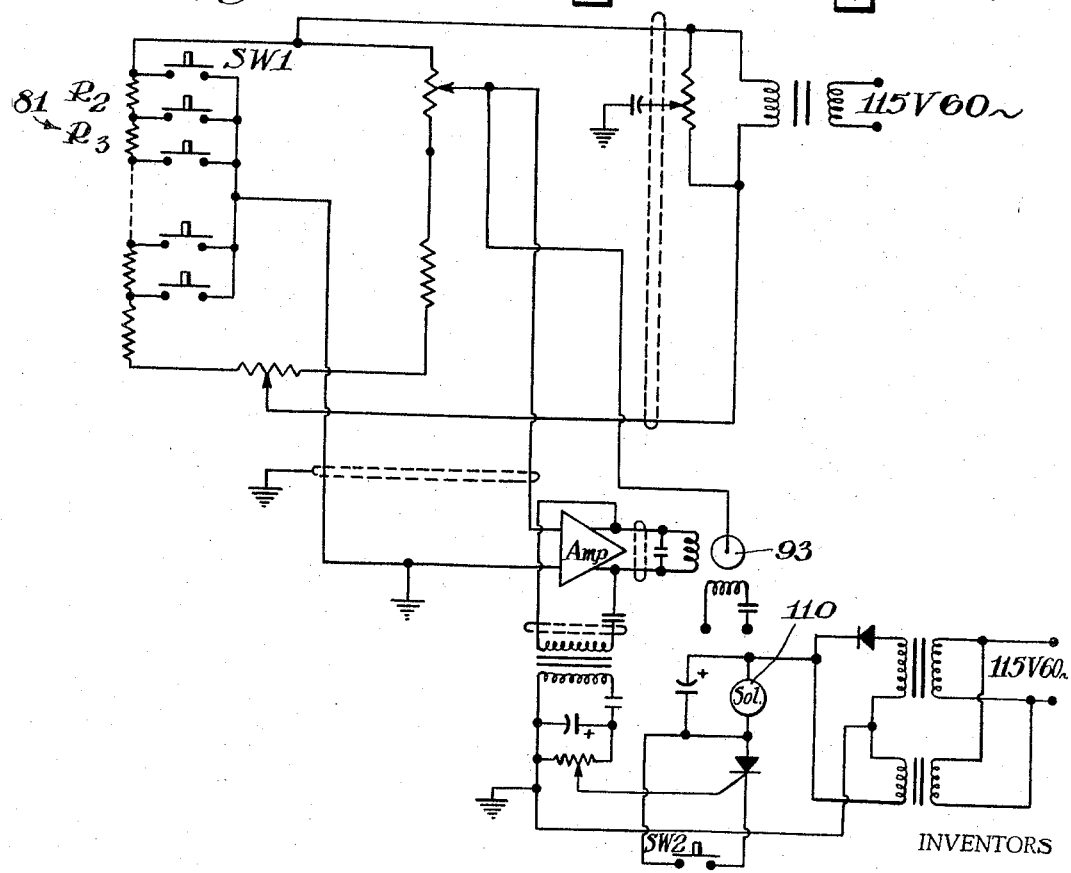

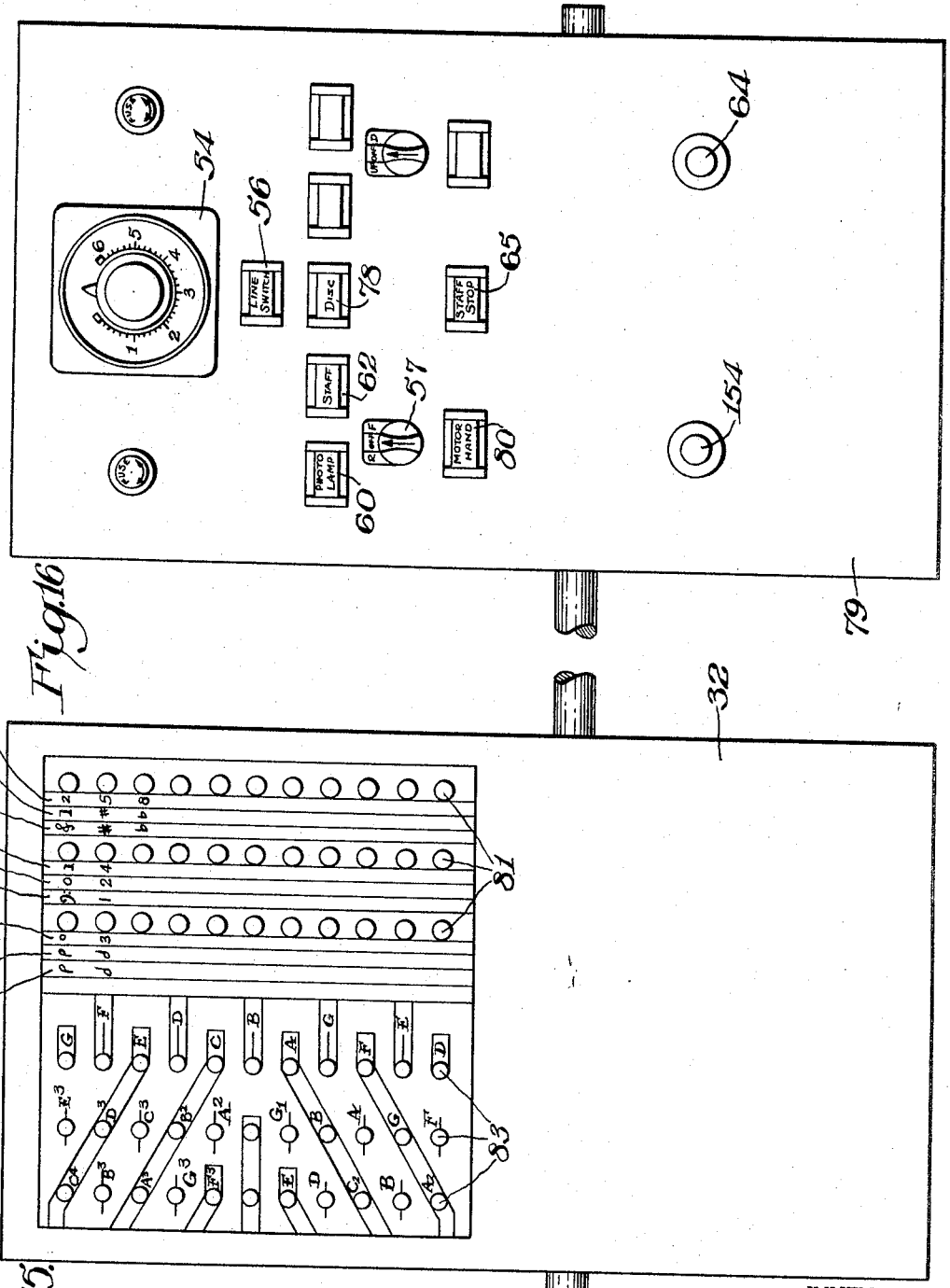

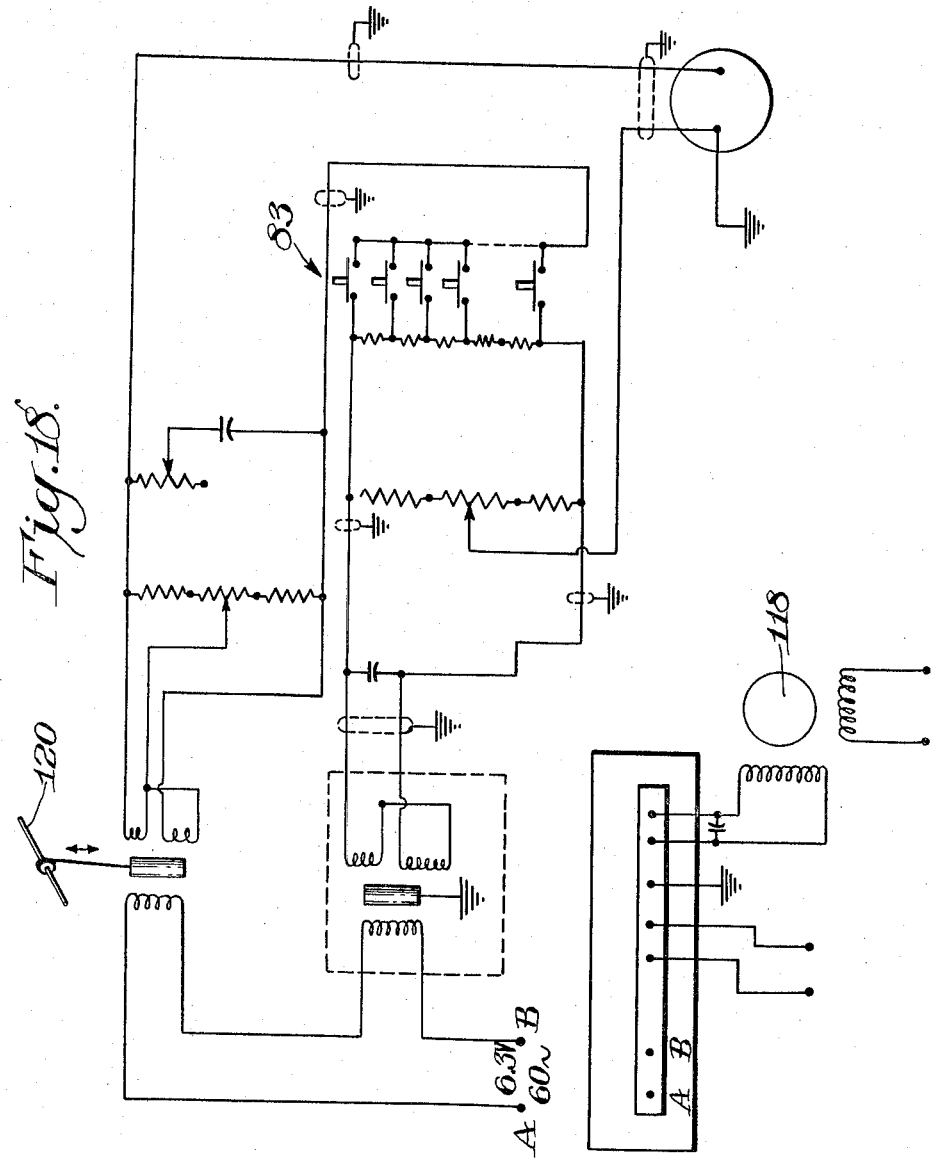

United States Patent Office 3,304,847
Patented Feb. 21, 1967

3,304,847
APPARATUS FOR COMPOSING MUSIC COPY
Henry Blake Wilson, Wilmington, Del., and Allen W. Mickel, Chadds Ford, Pa., assignors to Kaumagraph Company, Wilmington, Del., a corporation of Delaware
Filed Jan. 21, 1965, Ser. No. 427,024
13 Claims. (Cl. 95—4.5)

This application is a continuation-in-part of copending application Serial No. 98,959, filed March 28, 1961, now Patent No. 3,169,458.

This invention relates to an apparatus for composing music copy by photographic means, and it more particularly relates to such an apparatus which utilizes a contact photographic process.

Fine music copy has been produced for centuries by means of handengraved metal plates prepared by expert engravers who have many years of training. In recent years, attempts have been made to provide newer methods and apparatus which are better adapted to rapid mass production such as numerous varieties of musical typewriters. However, none of these typewriters can compose precisely enough to satisfy the needs of discriminating musicians particularly where the music is complicated. The notes of fine music copy must be evenly spaced in integral measure upon each line, and extreme accuracy is required in the application of bridging symbols such as slurs and hooks. Anything short of perfection in the production of fine music copy is unacceptable.

A recently developed apparatus which is described in parent application Serial No. 98,959, filed March 28, 1961, has effectively fulfilled the needs indicated above. In this apparatus a light source is mounted over a table upon which a light sensitive sheet is mounted. A feeding means selects predetermined light-passing musical images from a magazine and places them at an exposure station between the light source and the sensitive material to print selected symbols upon this material. A vertical and lateral translating means reacts between the exposure station and the table to vary their vertical and lateral orientation relative to a staff positioned upon the table for placing the symbols and notes in their proper positions relative to a staff applied to the light sensitive material.

The above-described apparatus, however, requires substantially manual operation to compose the music copy. Additionally, since light sensitive paper is used with the above described apparatus, the operator must work in semi-darkness. It is accordingly, essential for accurate reproduction of music copy that some means be provided to illuminate the reference surface so that the operator will be able to select the proper symbols without adversely affecting the light sensitive paper.

An object of this invention is to provide an apparatus for composing music copy which is substantially automatic in operation.

A further object is to provide such an apparatus which includes means for illuminating the reference symbols of the device.

In accordance with this invention the support for the exposure station and symbol magazine is provided with a sensing device which can be positioned over the reference surface for holding the master record of the symbols to be copied. As the support is moved laterally across the light sensitive material and across the reference surface, the sensing device illuminates the reference surface so that the operator can easily see the symbols to be printed. Additionally, when the sensing device is over the symbol to be printed, the sensing device stops the lateral movement of the support so that the symbol may be accurately reproduced on the light sensitive paper to print the corresponding symbols on the light sensitive paper.

In a particularly advantageous form of this invention, the sensing device is a photocell which includes its own light source for illuminating the reference surface. Additionally the photocell is arranged to inactivate the lateral translating means of the apparatus when the photocell detects, for example, the faint center light of the note or symbol to be printed. Although photocells have been previously used as tripping or detecting means, this function has been confined to detecting relatively large objects or lines which move at, for example, a rapid speed. However, because the support moves over the table at a relatively slow speed, the photocell of this device can be used to detect the faint, thin center line of the symbols on the reference surface.

Novel features and advantages of the present invention will become apparent to one skilled in the art from a reading of the following description in conjunction with the accompanying drawings wherein similar reference characters refer to similar parts and in which:

FIG. 5 is a plan view of a portion of the apparatus shown in FIGS. 1–3;

FIG. 8 is a cross-sectional view taken through FIG. 7 along the line 8—8;

FIG. 9 is a bottom plan view of the exposure station shown in FIG. 8;

FIG. 10 is a cross-sectional view taken through FIG. 1 along the line 10—10;

FIG. 11 is a diagrammatic representation of the table lifting device in FIGS. 1–3;

FIG. 12 is a perspective view of the sensing device shown in FIGS. 1–3;

FIG. 13 is a top plan view of the sensing device shown in FIG. 12 with the cover removed;

FIG. 14 is a side view in elevation of the transformer shown in FIG. 1;

FIGS. 15 and 16 are top plan views of the control panels shown in FIGS. 1 and 3;

FIG. 17 is an electrical diagram of the disc positioning circuit; and

FIG. 18 is an electrical diagram of the table positioning circuit.

Figure 1:
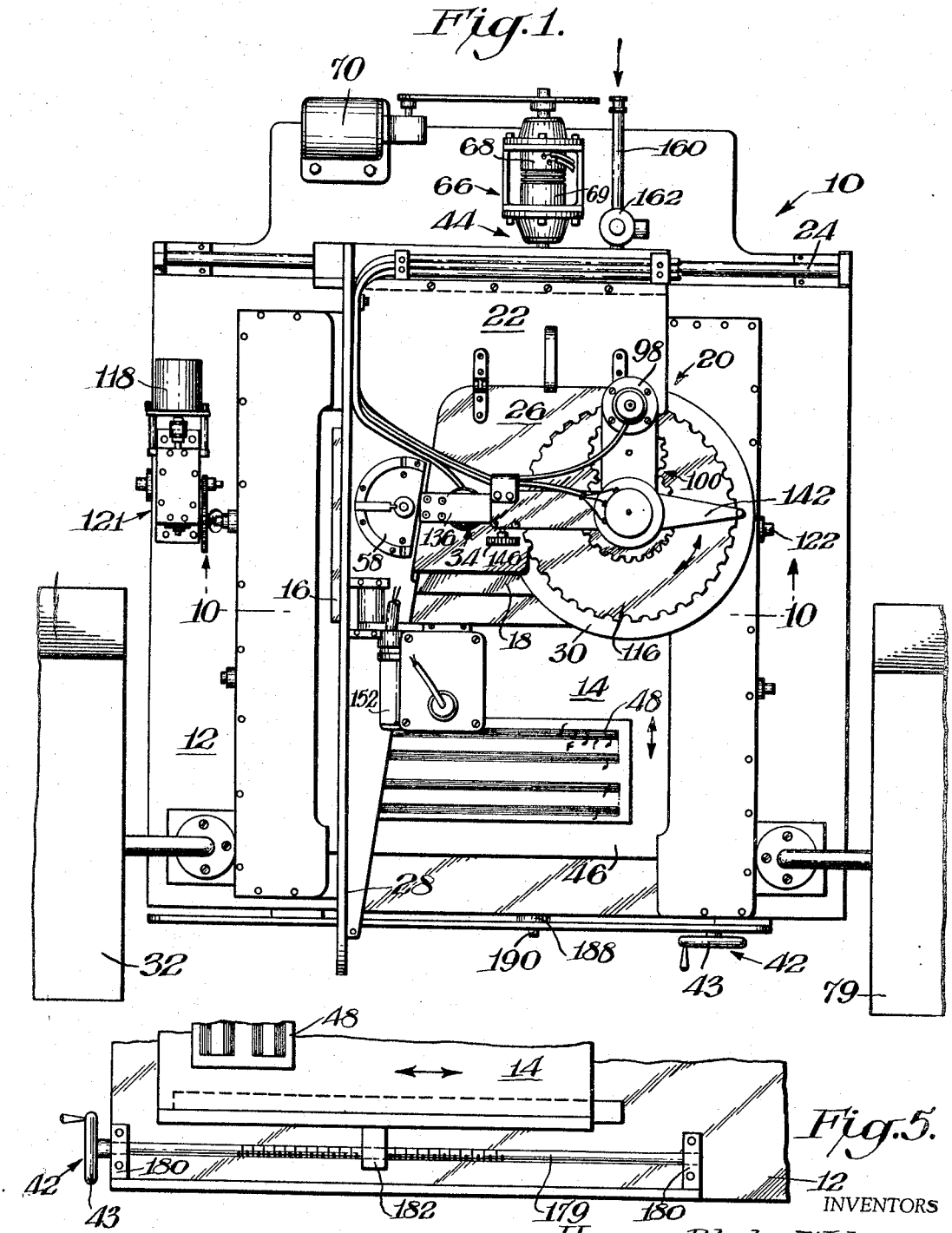
FIG. 1 is a top plan view of one embodiment of this invention.
Figure 2:
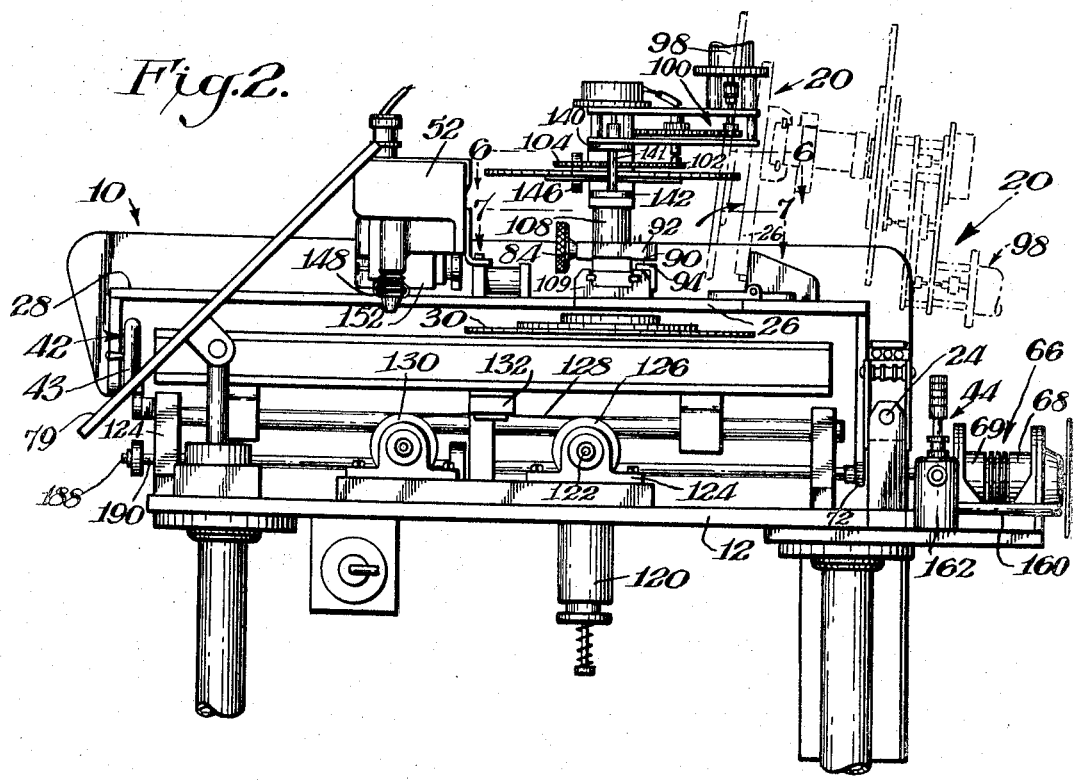
FIG. 2 is a side view in elevation of the apparatus shown in FIG. 1.
Figure 3:
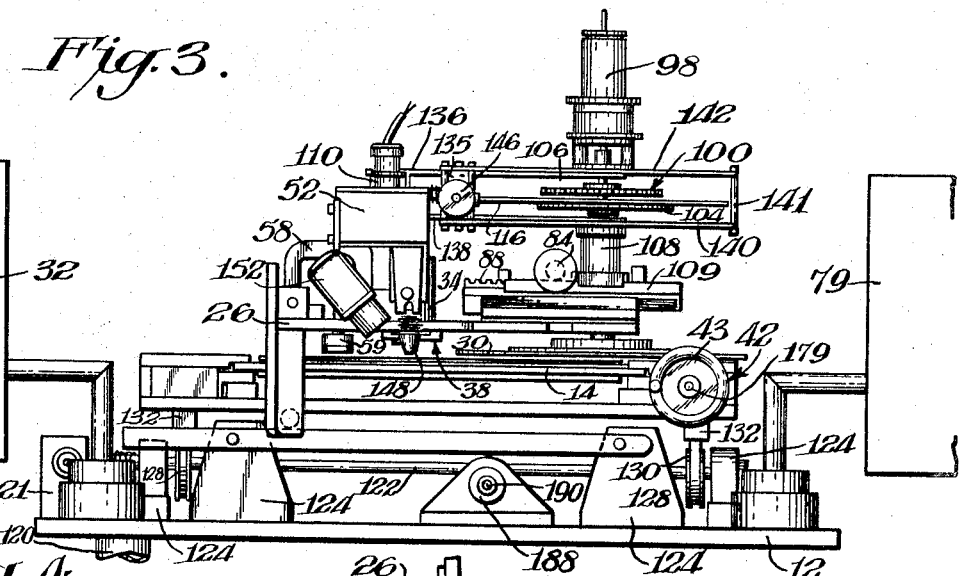
FIG. 3 is a front view in elevation of the apparatus shown in FIGS. 1–2.

As shown in FIGS. 1–3, the apparatus 10 for composing music copy includes a stationary frame 12 upon which is slidably mounted a table 14. Table 14 is recessed to receive a removable platen 16 which holds light sensitive paper 18, as best shown in FIGS. 8 and 10. Mounted above table 14 is a movable support generally designated by the numeral 20. As best seen in FIGS. 1–2, support 20 includes a main plate member 22 which is hinged about shaft 24. A secondary plate member 26 in turn is hinged to main plate 22. A portion 28 of main plate 22 extends completely across table 12 as will later be described in detail. Symbol magazine 30 which contains a variety of musical symbols is secured to secondary plate 26 and is controlled by control panel 32 so that a preselected symbol can be positioned in front of exposure station 34 which is connected to main plate 22.

As best shown in FIGS. 8–9 exposure station 34 includes a source of light 36 which is mounted in back of adjustable aperture means 38 which in turn includes a reciprocating frame 40 of the type described in parent application S.N. 98,959, filed March 28, 1961 to govern the size of the light beam passing from light source 36 to impinge upon image disc or symbol magazine 30 and sheet 18 under it.

Apparatus 10 also includes a manual translating means 42 which is adjustable to move table 14 and thus vary the position of the light sensitive paper 18 relative to support 22 for printing a number of staffs on sheet 18. Sheet 18 is, of course, horizontally disposed on platen 16 and translating means 42 moves table 14 horizontally parallel to support 22 and frame 12. However, translating means 42 is referred to as a vertical translating means because the movement of the table changes the vertical positioning of the light sensitive paper for printing a number of staffs thereon. Apparatus 10 also includes means 44 for moving support 20 laterally across the staff on light sensitive paper 18.

The front portion 46 of table 14 is a reference surface for holding the master record staff 48 from which the operator selects the proper symbols and determines the note spacing for composing the music copy. As best shown in FIG. 12, record staff 48 has imprinted on it the musical copy which is desired to be produced. This includes faint center lines 50 for each symbol. As support 20 moves across table 14 the sensing device or photocell 52 detects the center line 50 and inactivates the lateral translating means 44. A note is printed and translating means 44 is re-activated for printing the next note. When the operator has completely printed a line he manually returns support 20 to its original position by pushing against the portion 28 of support plate 22 which extends beyond table 14. Vertical translating means 42 moves table 14 in position for printing the next staff and its notes.

The following is a detailed description of a typical automatic printing operation.

At the beginning of a printing operation the operator first selects the proper developing time for light sensitive material 18 by adjusting developer timer 54 which is shown in FIG. 16. Timer 54 is electrically connected to light source 36 and slip clutch 66 as later described. The operator depresses button 56 and rotates knob 57 to engage translating means 44 in the forward direction of automatic operation to actuate the circuity of apparatus 10. Knob 57 controls the direction (i.e. forward or reverse) of translating means 44.

Figure 4:
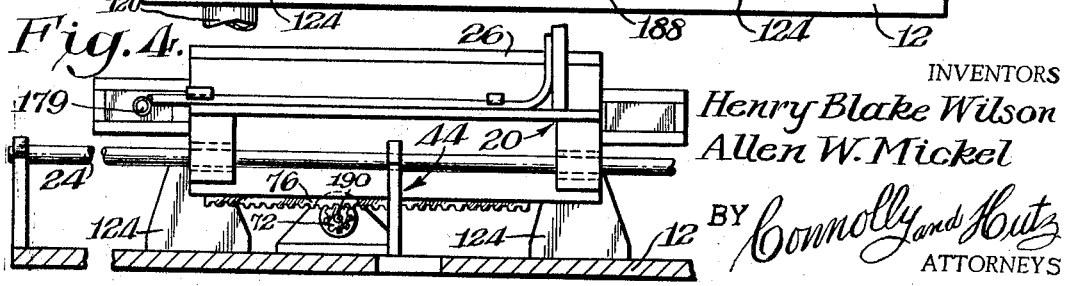
FIG. 4 is a back view in elevation of the apparatus shown in FIGS. 1–3 with portions removed.

The first operation to be performed is the printing of a staff. Auxiliary symbol mounting device, which is fully described in pending application serial No. 423,040 filed by the same inventors, is manipulated to position staff symbol 59 at exposure station 34. The operator next depresses button 62 and 64 to actuate lateral translating means 44. Line switch 56 is connected in a conventional manner to motor 70 (FIG. 1) to begin the operation of motor 70 which drives magnetic slip clutch 66; print button 64 is connected to slip clutch 66 to create a magnetic field in the slip clutch so that clutch members 68 and 69 are engaged, which in turn actuates lateral translating means 44. When slip clutch 66 is engaged, pinion 72 shown in FIGURE 4 drives rack 76 which is connected to support plate 22 so that the entire support structure 20 including exposure station 34 and auxiliary mounting device 58 are moved across light sensitive paper 18. When a complete staff is printed, the operator depresses button 64 to disengage slip clutch 66. Motor 70, however, is continuously operating throughout all the printing operations.

The operator then prints the various symbols from reference staff 48 by first depressing button 78 on control panel 79 to actuate the circuit shown in FIGURE 17, which selects a symbol or note from disk 30. The operator also depresses button 80 which is connected to slip clutch 66 similarly to the connection of staff print button 64 so that the slip clutch is engaged.

Engagement of slip clutch 66 causes support plate 22 to move across table 14. Scanning or sensing device 52 which is hinged to plate 22 illuminates reference staff 48. As the light from scanning device 52 approaches the notes or symbols on staff 48 the operator is able to determine which note or symbol is to be printed.

Figure 7:
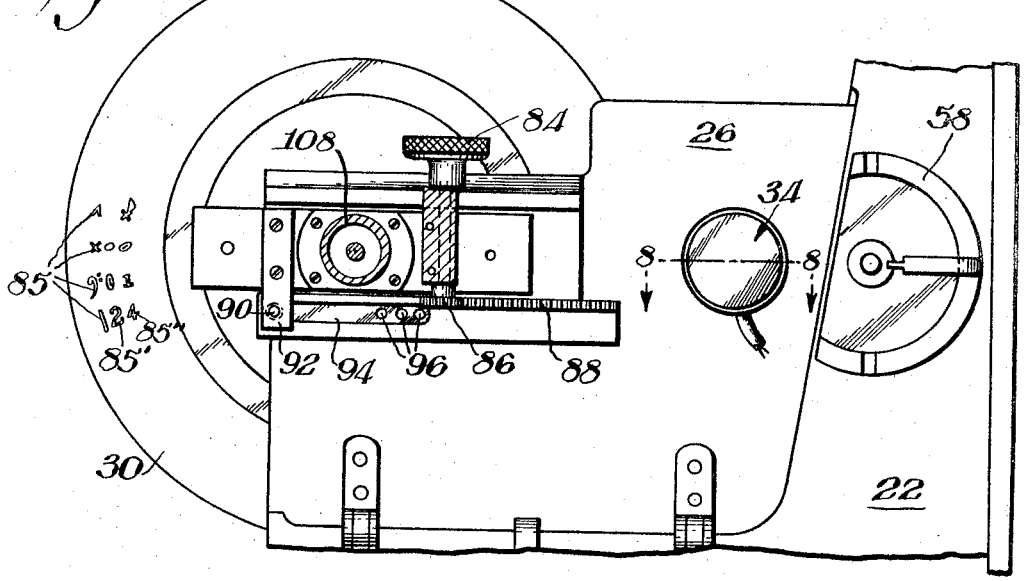
FIG. 7 is a cross-sectional view taken through FIG. 3 along the line 7—7.

As shown in FIGURE 15 panel 32 includes three rows 81 of symbol actuating buttons, each of which controls three different symbols 85, 85', 85". These symbols 85, 85', 85" are similarly arranged on symbol magazine or disk 30, as shown in FIGURE 7, in three annular rows of symbols. As later described, each set of three symbols on disk 30 is controlled by a button 81 on panel 32. By referring to panel 32 the operator can quickly determine which row, 85, 85', or 85" contains the symbol to be printed. The operator manually positions the proper row in front of exposure station 34 by rotating knob 84 which is secured to a drive gear 86 over rack 88. As best shown in FIGURES 2 and 7, knob 84 is secured to a plate 92 which carries a ball 90. An L-shaped plate 94 is secured to disk 30 and carries a series of four detents. In the position shown in FIGURE 7, ball 90 is in the detent at the extreme left, when symbol magazine or disk 30 is in its inactive position, for example, while staff 59 is being printed. As the operator rotates knob 84, ball 90 moves toward one of the other detents. Each detent 96 corresponds to a set of rows 85, 85', 85" of symbols on disk 30. The operator continues rotating knob 84 until ball 90 rests in the proper detent 96 for disposing the appropriate row of symbols at exposure station 34.

After the appropriate row of symbols is exposed at exposure station 34 the operator then presses the proper button 81 on control panel 32 to position that particular note at exposure station 34. When the circuit shown in FIGURE 17 is actuated by depressing button 78, note selection motor 98 is turned on and rotates drive gear 102 (FIGURE 6) through gear train 100. Gear 102, in turn, rotates shaft 106 through intermediate gear 104. Notched disk 116 is secured to shaft 106 and is thus rotated by the shaft 106. Disk 116 has a series of notches 114 about its periphery. Each notch 114 corresponds to a particular set of symbols controlled by a button 81. A solenoid 110 is secured to auxiliary support plate 26, as will later be described with respect to zeroing device 144, with its plunger 112 adjacent the periphery of disk 116 so that its plunger 112 can enter one of the notches 114 and thus maintain shaft 106 and disk 30 stationary with the proper note on disk 30 positioned at exposure station 34. Motor 98 is reversable. Thus, for example, when a particular notch 117 is to be disposed in front of solenoid 110, disk 116 is rotated in a clockwise direction. However, if, for example, a notch 119 were to be disposed in front of solenoid 110 then 116 would be rotated in a counterclockwise direction.

Shift 106 extends through disk 116 and through hollow cylinder 108 where it engages drive member 109 which in turn is connected to disk or symbol magazine 30. Drive member 109 has an elongated slot so that magazine 30 can be laterally shifted and still be driven by shaft 106.

Figure 6:
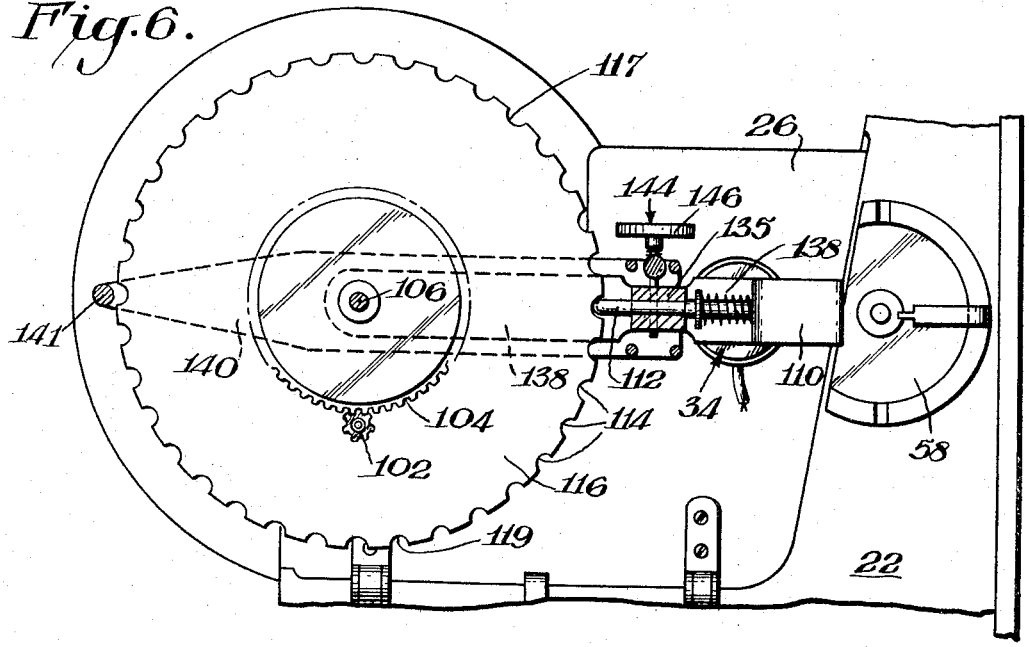
FIG. 6 is a cross-sectional view taken through FIG. 2 along the line 6—6.

As shown in FIGS. 1, 3 and 6, the symbol selecting means also includes a fine zeroing device 144. The fine zeroing device 144 comprises a rigid frame 140, 141, 142 (FIG. 3) secured to hollow cylinder 108. Shaft 106 extends through a slot in frame members 140 and 142. A guide block 135 is positioned between members 140 and 142, and solenoid plunger 112 extends through block 135. An inner pivotable frame including member 136 and 138 is rigidly secured to solenoid 110 and pivots about shaft 106 to radially shift the position of plunger 112 with respect to the notches 114 on disk 116. A threaded stud 143 is engaged with a nut inside block 135. When stud 143 is rotated by knob 146 block 135 is shifted which in turn causes inner frame 136, 138 to pivot about shaft 106. This in turn pivots solenoid 110 and its plunger 112. Accordingly, by manipulation of knob 146 plunger 112 can be positioned so that it will accurately enter a notch 114 instead of striking a smooth unnotched portion of disc 116. The fine zeroing device 144 described in detail above is adjusted at the very beginning of the printing operation, even before line switch button 56 is depressed.

When the operator selects the proper button 81 from control panel 82 to dispose the appropriate note or symbol at exposure station 34, he also depresses a button 83 on control panel 82 to assure the accurate placement of that note on the staff. As shown in FIGURE 15, each button 83 corresponds to a line or space on the staff. When a button 83 is pressed, the circuitry shown in FIGURE 18 is activated. Motor 118 begins operating to drive linear variable differential transformer 120 through gear reduction box 121 and expose a different amount of coil or winding about shaft 122 so that the shaft rotates in the appropriate direction a predetermined amount. This amount is determined by the distance needed to shift table 14 so that the staff printed on light sensitive paper 18 is moved the distance required to position the note at exposure station 34 in the proper location on the staff. As shown in FIGURE 2, shaft 112 rotates a pulley 126 mounted in block 124 on stationary frame 12. A second pulley 130 is also mounted on frame 12 and a band 128 rides on both pulleys. Band 128 is connected to flange 134 which is secured to table 14. Rotation of shaft 122 thereby causes the entire table 14 to shift the proper amount. A second pair of pulleys are mounted on the opposite side of frame 12.

While support plate 22 is moving across table 14, scanning device 52 is positioned over reference surface 48. Photocell or scanning device 52 (shown in FIGS. 12–13) is, for example, of the type described in General Electric pamphlet "CR 7515–P202 Photoelectric Scanning Head" and includes a light source 152 and a lens 148. An adjustable slit-like lens opening 150 is in the photocell body 151. As scanning device 52 moves across reference staff 58, light source 152 illuminates the reference staff. Light source 152 casts, for example, a circle of light which is about ¼ inch in diameter. Accordingly, although the operator is working in semi-darkness, light source 152 enables him to clearly see the note that is to be printed before the scanning device is actually over the note. When scanning device 52 is over the center line 50 of the note which is to be printed, it stops the movement of lateral translating means 54. This is accomplished by a conventional electrical hook-up with slip clutch 66 so that the slip clutch is disengaged when the faint center line 50 is detected. The slow speed of, for example, 3 feet per minute permits scanning device 52 to detect this faint center line. Center line 50 is of a different shade and/or thickness to distinguish it from other lines on staff 58.

When slip clutch 66 is disengaged and the note is properly positioned with respect to the staff on light sensitive paper 18, the operator is now ready for the printing operation. Accordingly, the print button 154 is depressed to actuate air cylinder 156 through air-line 160 and valve 162. As best shown in FIGURES 10 and 11, piston rod 158, which reciprocates in cylinder 156 is connected to arm 167 through intermediate link 163. Arm 167 is mounted on shaft 161. A pair of connecting arms 165 and 165' are mounted on opposite ends of link 164 with arm 165 rotating on shaft 161. Arm 165' rotates on shaft 161', thus shaft 161 and 161' rotate in accordance with the reciprocal moving of link 163 and rotate cams 166 and 168 which are mounted under rollers 169 (FIG. 8) connected to spaced portions of table 14. When piston 158 is retracted by pressing button 154, the cams lift table 14 approximately ⅟₁₆ of an inch to put light sensitive paper 18 in contact with symbol magazine 30. Table 14 is vertically guided by a plurality of spaced pins 173 carrying springs 175.

This table raising means also actuates light source 36. Microswitch 170 is electrically connected to light source 36 of exposure station 30 and is actuated when it is moved over slanted block 172. Microswitch 170 is connected to a stationary part of apparatus 10, such as frame 12. As shown in FIG. 11, block 172 is secured to link 164. When piston 158 is retracted, link 164 and block 172 are moved toward the left in FIG. 10 with block 172 progressively moving switch arm 171 upwardly until microswitch 170 is actuated. Thus when light sensitive paper 18 is put in contact with disk 30, the light source 36 is turned on and the symbol is printed on the light sensitive paper.

Light source 36 is illuminated for a predetermined time which is set by developing timer 54. The developing timer 54 is also connected to cylinder 156 so that when the developing time is over, piston rod 158 is extended, to lower table 14 and shut off light source 36. The first note is thereby printed on light sensitive paper 18.

To print the next note, the operator again presses button 80 to reengage clutch 66 and actuate lateral translating means 44. The process of positioning the note and then raising the table to print the note is repeated until a complete staff is printed. To print the next staff and set of notes the operator pushes against the outer portion 28 of support plate 22 to return support plate 22 to its original position as rack and pinion 76, 72 are moved in the opposite direction. The operator then actuates vertical translating means to shift table 14 and position the next staff of reference surface 48 near scanning device 52.

FIGURE 5 shows the detatils of vertical translating means 42. A manually operated handle 43 is secured to the end of a rod 179 which rests in guide blocks 180. A threaded block 182 is secured to table 14 and rod 179 is engaged with the threaded block 182. Accordingly, by rotating handle 43, table 14 can be shifted over stationary frame 12. When table 14 is shifted the appropriate amount, the operator again prints a staff on light sensitive paper 18 as previously described and also prints the proper notes for completing the music copy.

Lateral translating means 44 may also be manually operated by rotating handle 188 which is secured to the end of rod 190. As shown in FIGS. 1–4 pinion 72 is secured to the other end of rod 190 whereby the rotation of handle 188 causes pinion 72 to drive support 22 over table 14 as previously described.

What is claimed is:

1. An apparatus for composing musical copy comprising a stationary frame, a table mounted upon said frame for supporting a sheet of light sensitive material, movable support means connected to said frame, a symbol magazine incorporating light passing images of a variety of musical symbols connected to said support means, a source of light mounted upon said support means for directing light upon the light sensitive material, an exposure station on said support means positioned in front of said source of light, symbol image feeding means connected to said magazine for selecting a predetermined symbol image and disposing it at said exposure station between said light source and the light sensitive material, vertical translating means for varying the vertical orientation of the sheet disposed upon said table relative to said exposure station, lateral translating means for moving said movable support means laterally over said table, a reference surface on said table for holding a master copy of the music to be reproduced on the light sensitive paper, and sensing means including illuminating means on said support means disposed for positioning above said reference surface for detecting and illuminating a symbol to be printed, said sensing means being connected to inactivate said lateral translating means when the center line of a symbol is detected whereby each symbol may be accurately reproduced on the light sensitive paper with respect to a corresponding symbol on said reference surface.

2. An apparatus as set forth in claim 1 wherein said sensing means comprises a photocell secured to said movable support means and disposed for positioning over said reference surface, said photocell being connected to said lateral translating means for inactivating said lateral translating means when a center line of a note is detected on said reference surface, and said illuminating means being secured to said photocell for casting a ray of light on said reference surface.

3. An apparatus as set forth in claim 2 wherein said lateral translating means includes a slip clutch, said photocell being electrically connected to said slip clutch to disengage it when an elongated center line is detected on said reference surface, and said photocell having a slit-like opening for detecting the elongated center line.

4. An apparatus as set forth in claim 1 wherein said lateral translating means includes a slip clutch, a motor being connected to drive said slip clutch, a rack and pinion assembly being driven by said slip clutch when said slip clutch is engaged, and said rack and pinion assembly being connected to said support means for moving said support means laterally over said table when said slip clutch is engaged.

5. An apparatus for composing musical copy comprising a stationary frame, a table mounted upon said frame for supporting a sheet of light sensitive material, movable support means connected to said frame, a symbol magazine incorporating light passing images of a variety of musical symbols connected to said support means, a source of light mounted upon said support means for a directing light upon the light sensitive material, an exposure station on said support means positioned in front of said source of light, symbol image feeding means connected to said magazine for selecting a predetermined symbol image and disposing it at said exposure station between said light source and the light sensitive material, vertical translating means for varying the vertical orientation of the sheet disposed upon said table relative to said exposure station, lateral translating means for moving said movable support means laterally over said table, a reference surface on said table for holding a master copy of the music to be reproduced on the light sensitive paper, sensing means on said support means disposed for positioning above said reference surface for detecting and illuminating a symbol to be printed and for inactivating said lateral translating means when a symbol is detected whereby each symbol may be accurately reproduced on the light sensitive paper with respect to a corersponding symbol on said reference surface, said lateral translating means including a slip clutch, a motor being connected to drive said slip clutch, a rack and pinion assembly being driven by said slip clutch when said clip clutch is engaged, said rack and pinion assembly being connected to said support means for moving said support means laterally over said table when said slip clutch is engaged, a control panel being secured to said stationary frame, an actuating button being on said control and being electrically connected to said motor for actuating said motor, and control means on said panel being connected to said slip clutch to engage and disengage said slip clutch.

6. An apparatus as set forth in claim 1 wherein said symbol magazine includes a plurality of annular rows of musical symbols, and means being connected to said magazine for moving one of said rows into said exposure station.

7. An apparatus as set forth in claim 6 wherein said means for moving one of said rows includes gear means connected to said symbol magazine, manually accessible drive means engaged with said gear means for shifting said symbol magazine, and ball and detent means connected to said drive means and to said symbol magazine for maintaining said symbol magazine in a fixed position after it has been shifted.

8. An apparatus for composing musical copy comprising a stationary frame, a table mounted upon said frame for supporting a sheet of light sensitive material, movable support means connected to said frame, a symbol magazine incorporating light passing images of a variety of musical symbols connected to said support means, a source of light mounted upon said support means for a directing light upon the light sensitive material, an exposure station on said support means positioned in front of said source of light, symbol image feeding means connected to said magazine for selecting a predetermined symbol image and disposing it at said exposure station between said light source and the light sensitive material, vertical translating means for varying the vertical orientation of the sheet disposed upon said table relative to said exposure station, lateral translating means for moving said movable support means laterally over said table, a reference surface on said table for holding a master copy of the music to be reproduced on the light sensitive paper, sensing means on said support means disposed for positioning above said reference surface for detecting and illuminating a symbol to be printed and for inactivating said lateral translating means when a symbol is detected whereby each symbol may be accurately reproduced on the light sensitive paper with respect to a corresponding symbol on said reference surface, said symbol magazine including a plurality of annular rows of musical symbols, and means being connected to said magazine for moving one of said rows into said exposure station, said means for moving one of said rows including gear means connected to said symbol magazine, manually accessible drive means engaged with said gear means for shifting said symbol magazine, ball and detent means connected to said drive means and to said symbol magazine for maintaining said symbol magazine in a fixed position after it has been shifted, said symbol image feeding means including a disk having a plurality of notches about its periphery, each of said notches corresponding to a radial set of symbols in said plurality of rows of symbols on said symbol magazine, drive means connecting said notched disk with said symbol magazine for rotating said disk and said symbol magazine, solenoid means on said movable support means and disposed adjacent said periphery of said notched disk, said solenoid means including a plunger for entering one of said notches to maintain said disk and said symbol magazine stationary when one of the symbols of said symbol magazine is disposed in said exposure station, and control means for rotating said disk until a preselected notch is positioned adjacent said solenoid means and for causing said plunger to enter said preselected notch.

9. An apparatus as set forth in claim 8 wherein said symbol image feeding means includes fine zeroing means for accurately aligning said plunger with respect to said notches.

10. An apparatus for composing musical copy comprising a stationary frame, a table mounted upon said frame for supporting a sheet of light sensitive material, movable support means connected to said frame, a symbol magazine incorporating light passing images of a variety of musical symbols connected to said support means, a source of light mounted upon said support means for a directing light upon the light sensitive material, an exposure station on said support means positioned in front of said source of light, symbol image feeding means connected to said magazine for selecting a predetermined symbol image and disposing it at said exposure station between said light source and the light sensitive material, vertical translating means for varying the vertical orientation of the sheet disposed upon said table relative to said exposure station, lateral translating means for moving said movable support means laterally over said table, a reference surface on said table for holding a master copy of the music to be reproduced on the light sensitive paper, sensing means on said support means disposed for positioning above said reference surface for detecting and illuminating a symbol to be printed and for inactivating said lateral translating means when a symbol is detected whereby each symbol may be accurately reproduced on the light sensitive paper with respect to a corresponding symbol on said reference surface, said vertical translating means including shifting means connected to said table for varying the orientation of the light sensitive paper with respect to said exposure station, said shifting means comprising a transformer, a shaft driven by said transformer, a pulley on said shaft, a band connected to said table, a second pulley, and said band being disposed over both of said pulleys whereby rotation of said shaft causes said band to move said table.

11. An apparatus as set forth in claim 1 wherein print actuating means are connected to said table for raising said table to place the light sensitive material in contact with said symbol magazine when said symbol magazine is disposed at said exposure station, and said actuating means actuating said light source whereby the musical symbol disposed at said exposure station is printed on the light sensitive material.

12. An apparatus for composing musical copy comprising a stationary frame, a table mounted upon said frame for supporting a sheet of light sensitive material, movable support means connected to said frame, a symbol magazine incorporating light passing images of a variety of musical symbols connected to said support means, a source of light mounted upon said support means for a directing light upon the light sensitive material, an exposure station on said support means positioned in front of said source of light, symbol image feeding means connected to said magazine for selecting a predetermined symbol image and disposing it at said exposure station between said light source and the light sensitive material, vertical translating means for varying the vertical orientation of the sheet disposed upon said table relative to said exposure station, lateral translating means for moving said movable support means laterally over said table, a reference surface on said table for holding a master copy of the music to be reproduced on the light sensitive paper, sensing means on said support means disposed for positioning above said reference surface for detecting and illuminating a symbol to be printed and for inactivating said lateral translating means when a symbol is detected whereby each symbol may be accurately reproduced on the light sensitive paper with respect to a corresponding symbol on said reference surface, print actuating means being connected to said table for raising said table to place the light sensitive material in contact with said symbol magazine when said symbol magazine is disposed at said exposure station, said actuating means actuating said light source whereby the musical symbol disposed at said exposure station is printed on the light sensitive material, said print actuating means including a hydraulic cylinder, a piston reciprocating in said cylinder, cam means connected to said piston, and said cam means reacting against the bottom of said table whereby the reciprocation of said piston causes said table to move up and down.

13. An apparatus as set forth in claim 12 wherein said print actuating means includes a micro-switch connected to said light source, said micro-switch having an actuating arm, and an actuating surface being disposed for raising said actuating arm to close said micro-switch when said table is lifted upward.

References Cited by the Examiner

UNITED STATES PATENTS

| | | | |
|---|---|---|---|
| 1,603,953 | 10/1926 | Hunter | 95—4.5 |
| 1,980,287 | 11/1934 | Ogden | 95—4.5 |
| 2,742,831 | 4/1956 | Wirtz | 95—4.5 |
| 2,786,400 | 3/1957 | Peery | 95—4.5 |
| 2,922,893 | 1/1960 | Ett. | |
| 3,010,376 | 11/1961 | Johnson | 95—4.5 X |

FOREIGN PATENTS 506,635   5/1939   Great Britain.

JOHN M. HORAN, *Primary Examiner.*